M. D. KIMBALL.
NUT LOCK.
APPLICATION FILED JUNE 30, 1921.

1,417,334.

Patented May 23, 1922.

Inventor:
M. D. Kimball.
By David O. Barrell,
Attorney

Witness:
R. J. Honomichl.

UNITED STATES PATENT OFFICE.

MATTHEW D. KIMBALL, OF OMAHA, NEBRASKA, ASSIGNOR OF ONE-HALF TO DAVID P. FEDER, OF OMAHA, NEBRASKA.

NUT LOCK.

1,417,334.  Specification of Letters Patent.  Patented May 23, 1922.

Application filed June 30, 1921. Serial No. 481,524.

*To all whom it may concern:*

Be it known that I, MATTHEW D. KIMBALL, a citizen of the United States, and a resident of Omaha, in the county of Douglas and State of Nebraska, have invented certain new and useful Improvements in Nut Locks, of which the following is a specification.

My invention relates to means for locking nuts, whereby to prevent loosening movement thereof relative to the bolts on which they are placed, and particularly to nut-locking means wherein there is employed a bolt having a reduced, extension portion threaded oppositely to the main portion and provided with a locking-nut which is interconnected with the main nut to prevent rotation of either nut independently of the other. It is the object of my invention to provide a simple and inexpensive nut-locking device of the general character above indicated, and wherein the release or displacement of the locking means may be effected only by deliberate intention. A further object of my invention is to provide an auxiliary nut or locking nut having a recessed face adjoining the main nut, whereby it may be screwed down firmly against the main nut when the latter is so located that the main portion of the bolt projects through the nut at the side adjoining the locking nut.

Figure 1:
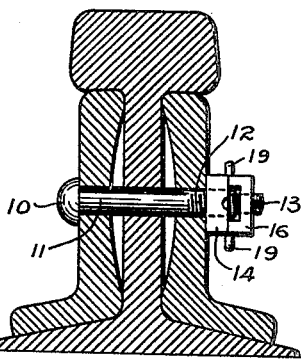
Figure 2:
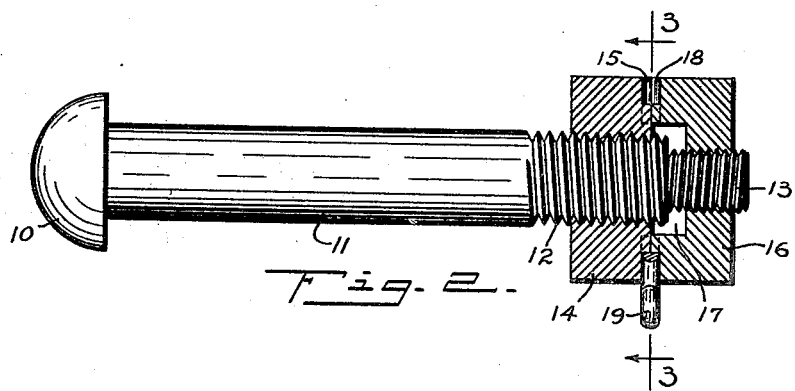
Figure 3:
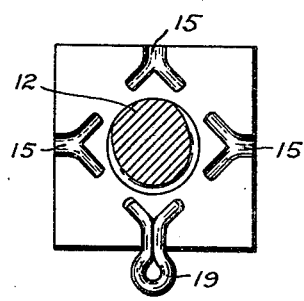
Figure 4:
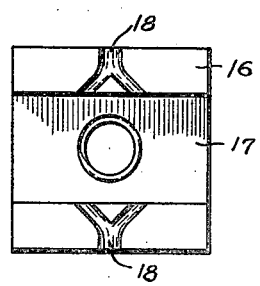

In the accompanying drawings Fig. 1 is a transverse section of a railway rail and fish-plates, secured together by a bolt and nut and nut-locking means embodying my invention, Fig. 2 is a detail longitudinal or axial section through the main and locking nuts, Fig. 3 is a transverse section on the line 3—3 of Fig. 2, and Fig. 4 is a view showing the inner face of the locking-nut, which adjoins the outer face of the main nut when the parts are assembled.

In the illustrated structure the bolt is of the type ordinarily used in railway construction for securing together the overlapping portions of rails and fish-plates, the bolt having a rounded head 10 and a cylindrical body or shank 11, the latter being provided at the end opposite the head with an ordinary right-hand V-thread 12. It will be understood, however, that my nut-locking means may be applied to bolts for any purpose where the variation in the position of the main nut upon the bolt is not excessive, and where a slight extension of the bolt beyond the main nut is not objectionable. In applying my locking means, the bolt is provided at its threaded end with a reduced extension 13 which has a left-hand thread, or a thread opposite in direction to the main thread 12. The nut 14 for the main body of the bolt is of ordinary form except that in the outer face thereof there is a plurality of Y-shaped grooves 15, each starting at the outer edge of the face, centrally of one of the sides of the nut, extending therefrom radially inward, the stem or main portion of the recess then joining a forked or bifurcated portion of which the branches extend divergently and terminate adjacent to the threaded opening for the bolt, without, however, intersecting the same. The locknut 16 is threaded to screw upon the reduced extended end-portion 13 of the bolt, but the outer dimensions of the locknut are substantially the same as the main nut. In the inner face of the locknut there is a transverse channel 17 of which the width is slightly greater than the diameter of the main bolt thread 12. The locknut may also be regarded as U-shaped in axial section, and the body of the nut as having at the inner side thereof two parallel flanges which form the sides of the recess or channel 17. In the faces of said parallel flanges which adjoin the main nut 14 there are Y-shaped grooves 18, which correspond with the grooves 15 in the main nut, and which are adapted to register therewith when the parts are in assembled position. It will be seen that as the locknut is screwed up into contact with the main nut the Y-grooves 18 will come into register with a pair of the grooves 15 at each quarter-turn, so that it will be very easy to stop the operation when said Y-grooves are in register. The nuts are then interconnected by driving into one or more of the registering pairs of Y-grooves a split cotter-pin 19. As the cotter-pin reaches the inner end of the radial outer portions of the Y-grooves, it divides and each side thereof enters one of the diverging bifurcated portions of the grooves, thus being bent as shown clearly in Fig. 3, whereby the subsequent withdrawal of the cotter is prevented, except by the deliberate application of sufficient force to straighten the bent portions of the pin during the withdrawing movement. It will be seen that by the provision of the transverse channel 17 in the face of the locknut, the parallel flanges at the sides of said nut may extend in over the end of the main threaded portion of the bolt and thus come into engagement with the end-face of the main nut 14, even though the latter should be screwed onto the bolt to a position considerably past the end of the main threaded portion. Independent rotation of the main nut and locking nut is prevented by the locking cotter-pin, and, as the threads engaged by the nuts are opposite in direction, it will be obvious that the same cannot work loose or move in the same direction longitudinally of the bolt except by rotation in opposite directions.

Now, having described my invention, what I claim and desire to secure by Letters Patent is:

1. Nut locking means comprising, in combination, a bolt having a main threaded portion and a reduced oppositely-threaded extended portion, a main nut adapted to fit upon the main threaded portion of the bolt, a locknut adapted to fit upon the reduced extended portion of the bolt and to engage the adjacent end-face of the main nut, the adjoining faces of the main nut and locknut having registering Y-grooves therein, and a cotter-pin having a split end-portion entering the bifurcated portions of a pair of the registering Y-grooves.

2. Nut locking means comprising, in combination, a bolt having main and auxiliary oppositely-threaded portions, a main nut and a locknut screwed respectively upon said oppositely-threaded portions of the bolt and having abutting end-faces, said end-faces having therein registering pairs of bifurcated grooves with stem-portions of said grooves extending to the sides of the nuts, and a split locking-pin adapted to enter the said stem-portions of the grooves and to be forced into the bifurcated parts thereof whereby to prevent withdrawal of the pin therefrom, said locking-pin preventing relative rotation of the nuts.

3. Nut locking means comprising, in combination, a bolt having a main threaded portion and a reduced extended portion threaded oppositely to the main portion, a nut screwed upon the main threaded portion of the bolt, a locknut screwed upon the reduced extended portion of the bolt, said locknut having in the face adjacent to the main nut a central channel whereby to form extended marginal flanges adapted to straddle the main threaded portion of the bolt projecting beyond the main nut and to thus engage the face of the main nut, said marginal flanges of the locknut having therein Y-grooves adapted to register with similar grooves in the face of the main nut, and a split locking-pin adapted to enter said registering Y-grooves and spread into the bifurcated portions thereof, for the purpose described.

4. Nut locking means comprising, in combination, a bolt having a main threaded portion and an adjacent portion threaded oppositely to said main portion, a main nut screwed on the main threaded portion of the bolt, a locknut screwed upon the oppositely threaded portion of the bolt, said locknut being recessed in the face thereof adjoining the main nut whereby to straddle a protruding portion of the main threaded portion of the bolt, there being registering Y-grooves in the abutting faces of the main nut and locknut, the stem portions of said Y-grooves extending to the sides of the nuts, and the diverging bifurcated portions of said grooves extending inwardly from the stem portions thereof, and a bifurcated pin extending into a registering pair of said Y-grooves and clinched therein.

MATTHEW D. KIMBALL.